US006961088B2

(12) United States Patent
Kameshima et al.

(10) Patent No.: US 6,961,088 B2
(45) Date of Patent: Nov. 1, 2005

(54) AREA SENSOR, IMAGE INPUT APPARATUS HAVING THE SAME, AND METHOD OF DRIVING THE AREA SENSOR

(75) Inventors: Toshio Kameshima, Kanagawa (JP); Noriyuki Kaifu, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 911 days.

(21) Appl. No.: 09/748,219

(22) Filed: Dec. 27, 2000

(65) Prior Publication Data

US 2001/0033336 A1 Oct. 25, 2001

(30) Foreign Application Priority Data

Dec. 27, 1999 (JP) .......................................... 11/371334
Dec. 13, 2000 (JP) ...................................... 2000/379144

(51) Int. Cl.[7] .................................................. H04N 3/14
(52) U.S. Cl. ........................ 348/303; 348/302; 348/304
(58) Field of Search ................................ 348/294–208, 348/303, 308, 316, 307, 306, 305, 302, 295, 304

(56) References Cited

U.S. PATENT DOCUMENTS 4,573,076 A * 2/1986 Tisue et al. ................. 348/297
4,621,291 A * 11/1986 Takemoto et al. .......... 348/303
4,797,560 A * 1/1989 Berger et al. ............... 348/309
4,835,617 A * 5/1989 Todaka et al. .............. 348/296
5,144,447 A * 9/1992 Akimoto et al. ............ 348/301
5,886,353 A * 3/1999 Spivey et al. .......... 250/370.09
5,920,070 A * 7/1999 Petrick et al. ......... 250/370.09
6,005,238 A * 12/1999 Mei et al. ................ 250/208.1
6,160,260 A 12/2000 Yamayoshi et al. .... 250/370.09
6,163,386 A * 12/2000 Kobayashi et al. ......... 358/482
6,172,369 B1 * 1/2001 Waechter et al. ...... 250/370.09
6,300,977 B1 * 10/2001 Waechter et al. ........... 348/300
6,433,767 B1 * 8/2002 Murade ....................... 345/92
6,462,723 B1 * 10/2002 Yamazaki et al. ............ 345/82
6,475,824 B1 * 11/2002 Kim ........................... 438/66
6,690,493 B1 * 2/2004 Kobayashi et al. ......... 358/482
6,720,594 B2 * 4/2004 Rahn et al. ................. 257/291
6,753,854 B1 * 6/2004 Koyama et al. ............ 345/204
2001/0012070 A1 * 8/2001 Enod et al. ................. 348/302
2002/0067416 A1 * 6/2002 Yoneda et al. .............. 348/304

FOREIGN PATENT DOCUMENTS

EP 977268 A2 * 2/2000 ......... H01L/27/146

* cited by examiner

*Primary Examiner*—Wendy R. Garber
*Assistant Examiner*—Nelson D Hernandez
(74) *Attorney, Agent, or Firm*—Fitzpatrick, Cella, Harper & Scinto

(57) ABSTRACT

In order to eliminate impairment due to a disconnection and to make driving at high speed possible, a semiconductor device is provided which includes a plurality of pixels, each having a switching element, arrayed two-dimensionally, which includes a plurality of common lines connected to the switching elements arrayed in a direction, and which drives the switching elements. A plurality of driving devices for applying a control signal are connected to the common lines.

32 Claims, 15 Drawing Sheets

AREA SENSOR, IMAGE INPUT APPARATUS HAVING THE SAME, AND METHOD OF DRIVING THE AREA SENSOR

BACKGROUND OF THE INVENTION

1. Field of the Invention

The present invention relates to area sensors for use in digital cameras, X-ray photographing apparatuses, etc., relates to image input apparatuses, such as digital cameras and X-ray photographing apparatuses having area sensors, and relates to methods for driving the area sensors. More particularly, in an area sensor in which pixels having photoelectric conversion elements and switching elements are arrayed two-dimensionally, the present invention relates to an area sensor in which a driving signal for driving each pixel is applied from opposing two sides, relates to an image input apparatus having the area sensor, and relates to a method of driving the area sensor.

2. Description of the Related Art

An example of an area sensor in which pixels having photoelectric conversion elements and switching elements are arrayed two-dimensionally is described with reference to FIGS. 1, 2A, 2B, 2C, and 3.

FIG. 1 is a schematic circuit diagram of an example of an area sensor having photoelectric conversion elements and switching elements in pixels. FIG. 2A is an equivalent circuit diagram of a gate line of an area sensor. FIGS. 2B and 2C are diagrams illustrating the status of a driving waveform applied to the gate line from a gate driver. Also, FIGS. 2B and 2C are conceptual diagrams illustrating the shape of a driving waveform (gate pulse) at point A and point B, respectively, in FIGS. 1 and 2A. FIG. 3 is a timing chart illustrating an example of the driving of the gate driver in the area sensor.

Each pixel S of the area sensor shown in FIG. 1 is formed of a photoelectric conversion element (herein, a photodiode) PD and a thin-film transistor (TFT) Tr. The cathode electrode of the photodiode PD is connected to a bias line Vs, and a bias voltage is applied by a power supply 3. The source electrodes of the thin-film transistors Tr are connected to the data lines Sig1 to SigN for each pixel column, and the gate electrodes of the thin-film transistors Tr are connected to the gate lines Vg1 to VgN for each pixel row. In this example, wiring necessary for driving the area sensor is the bias line Vs, the data lines Sig1 to SigN, and the gate lines Vg1 to VgN. Furthermore, the anode electrodes of the photodiodes PD and the drain electrodes of the thin-film transistors Tr are connected to each other by pixels. In this example, the data lines Sig1 to SigN are arranged in the vertical direction in FIG. 1, and the gate lines Vg1 to VgN are arranged in the horizontal direction. In addition, each of the data lines Sig1 to SigN is connected to a reading apparatus 1. Generally, the reading apparatus 1 comprises an amplifier 1*a* to which each of the data lines Sig1 to SigN is connected, and an analog multiplexer 1*b* to which a signal from each amplifier 1*a* is input. On the other hand, each of the gate lines Vg1 to VgN is connected to a gate driver 2. Generally, the gate driver 2 comprises a shift register.

Image information which is photoelectrically converted by each pixel is transferred to the reading apparatus 1 through the data lines Sig1 to SigN, and is output as a serial signal for each gate line.

In the area sensor, the gate driver and the reading apparatus are connected to each other only at one side of a rectangular area which is an image receiving area in which pixels are arrayed. However, the area sensor having such a connection relationship has a problem in that, in a case where a disconnection occurs in the gate line or the data line, the driving of pixels in a portion after the disconnection and the transfer of a signal from the pixels cannot be performed.

Also, even when a disconnection has not occurred, the gate line of the area sensor includes a resistor. In particular, when the image receiving area is enlarged, or when the pixels are arranged in finer lines and the gate line width is reduced, cases occur in which the resistance cannot be substantially ignored. The gate line of the area sensor can be expressed by a resistor Rvg of the gate line itself and a parasitic capacitor Cvg of the gate line, as in FIG. 2A, from a point of view of an equivalent circuit. Therefore, in the gate pulse (see FIG. 2B) which is applied to "A" of the gate line VgN in FIG. 1, a delay occurs in the signal at "B" of the gate line VgN due to the resistor Rvg and the parasitic capacitor Cvg, the waveform is deformed as shown in FIG. 2C, and a wavelength width in a portion exceeding a threshold voltage Vth is varied. Generally, in order to turn on a TFT and to transfer electric charge, it is necessary for the time period during which a voltage exceeding the threshold voltage Vth to be a time period Tb or more. When such a delay of a waveform as that described herein occurs, since the time period in which this threshold voltage Vth is exceeded becomes short, the time period Ta of the original pulse width must be set to be long so as to secure the time period Tb required for transferring electric charge.

As shown in the driving timing chart of FIG. 3, in order to drive the entirety of the area sensor, due to this delay, a time period becomes necessary which is extended by an amount corresponding to $(Ta-Tb)\times N$ (N is the number of lines). There are cases in which this becomes an obstacle to driving the area sensor at an even higher speed.

As described above, the area sensor could be further improved in view of the fact that the driving of pixels in a portion after a disconnection and the transfer of a signal from the pixels cannot be performed and in order to perform high-speed driving.

SUMMARY OF THE INVENTION

The present invention has been achieved in view of the above-described problems in the area sensor. An object of the present invention is to provide an area sensor in which there is no effect due to disconnections and which is suitable for high-speed driving, to provide an image input apparatus having the area sensor, and to provide a method of driving the area sensor.

Another object of the present invention is to provide a highly reliable area sensor in which there is no defective driving such as that which occurs due to a disconnection of wiring which crosses an image receiving area such as gate lines and data lines, and in which there is no impairment such as inability to obtain data, and in which image information can be output stably, to provide an image input apparatus having the area sensor, and to provide a method of driving the area sensor.

Another object of the present invention is to provide an area sensor which is capable of supplying a desired driving waveform, which can be driven at high speed, and as a result which is suitable for obtaining a moving image, to provide an image input apparatus having the area sensor, and to provide a method of driving the area sensor.

Another object of the present invention is to reduce random noise arising from the wiring resistance of the gate line and to realize a higher S/N ratio.

Another object of the present invention is to provide an area sensor having an image receiving area which is larger, an image input apparatus having the area sensor, and a method of driving the area sensor, and to provide an area sensor, in which a driving speed is not decreased due to the larger area, or in which driving speed can be improved, the decrease in the driving speed being minimized in comparison with a case in which area sensors having an image receiving section of a small area are combined, and higher definition reading and display being made possible, to provide an image input apparatus having the area sensor, and to provide a method of driving the area sensor.

To achieve the above-mentioned objects, in a first aspect, the present invention provides an area sensor comprising: plural pixels, each having a switching element, arranged two-dimensionally, and plural common lines which are connected to the switching elements corresponding to the pixels which are arrayed in a direction, a control signal being applied to the common line in order to drive the switching element, wherein plural driving means for applying the control signal are connected to the common lines.

In a second aspect, the present invention provides an area sensor comprising: plural pixels, each having a thin-film transistor and a photoelectric conversion element, arranged two-dimensionally, and plural common source lines which are connected to the source electrodes of the thin-film transistors which are arrayed in a direction, wherein plural signal reading means are connected to the common source lines.

In a third aspect, the present invention provides an area sensor comprising: plural pixels, each having a thin-film transistor and a photoelectric conversion element, arranged two-dimensionally, plural common gate lines which are connected to the gate electrodes of the thin-film transistors which are arrayed in a direction, and plural common lines which are connected to the source or drain electrodes of the thin-film transistors which are arrayed in another direction, wherein plural signal reading means are connected to the common lines, and plural gate driving means are connected to the common gate lines.

In a fourth aspect, the present invention provides a method of driving an area sensor having plural pixels, each having a switching element, arranged two-dimensionally, and having a pixel sequence in which the switching elements are connected to a common line, the method comprising the steps of: applying a control signal for driving the switching elements at the same time from at least two different points of the common line; and driving the switching elements which is connected to the common line in accordance with the control signal applied to the common line.

In a fifth aspect, the present invention provides an image input apparatus comprising: an area sensor having plural pixels arranged therein two-dimensionally, each pixel having a thin-film transistor and a photoelectric conversion element, having plural common gate lines which are connected to the gate electrodes of the thin-film transistors arrayed in one direction and plural common lines which are connected to the source or drain electrodes of the thin-film transistors arrayed in another direction, having plural signal reading means connected to the common lines, having plural gate driving means connected to the common lines, and having a wavelength conversion member in the photoelectric conversion element; an electromagnetic-wave generation source; image processing means for processing an image signal from the area sensor; and display means for displaying an image on which image processing is performed.

According to the present invention having such a construction, it is possible to eliminate impairment, such as the entirety of one line being incapable of being driven due to a disconnection. Furthermore, it is possible to provide an area sensor which can be driven at a higher speed.

Furthermore, according to the present invention, it is possible to read image information at a higher definition. In addition, according to the present invention, since driving at a higher speed becomes possible, it is possible to capture a moving image. As a result, when X-ray transmitted images are to be read, it is possible to continuously observe the motion of an object in real time. Therefore, not only is the operation efficiency significantly improved, but also during medical or structural analyses, and during security checks, the examination time can be reduced and the examination system can be further improved, thus making more precise decisions and diagnoses possible.

In the present invention, a photoelectric conversion element is provided in a common manner or is provided individually in each pixel. In a case in which the pixels are provided in a common manner, it is preferable that the photoelectric conversion information thereof be adjusted so as not to generate crosstalk for each pixel. For the photoelectric conversion element, it is preferable that an amorphous semiconductor, for example, amorphous silicon, be used for a larger area. For the photoelectric conversion element, any of a diode type, photoconductive type, or transistor type may be used.

It is a matter of course that the photoelectric conversion element is not limited to these structures. An MIS (metal-insulation-silicon)-type structure in which the capacitor structure and the photoelectric conversion element are integrated may be used. In such a case, it is possible to read the photoelectrically converted image information in a nondestructive manner, and it is possible to substantially adjust the sensitivity by adjusting the storage time by the adjustment of the photoelectric conversion period.

Alternatively, since electromagnetic waves such as X rays enable direct photoelectric conversion, it is possible to use amorphous selenium, lead(II) iodide ($PbI_2$), and gallium arsenide in the photoelectric conversion section.

The gate driving means and the signal reading means of the area sensor may be connected to the common gate line or the common source line by, for example, an anisotropic connection which is a wiring connection using an anisotropic conductive resin. This makes it possible to reduce the time and effort required to manufacture the area sensor when a larger area is to be provided.

As switching elements, thin-film transistors may be preferably used.

The above and further objects, aspects and novel features of the invention will become more fully apparent from the following detailed description when read in conjunction with the accompanying drawings.

DETAILED DESCRIPTION OF THE PREFERRED EMBODIMENTS

The preferred embodiments of the present invention are described below with reference to the accompanying drawings.

<First Embodiment>

Figure 1:
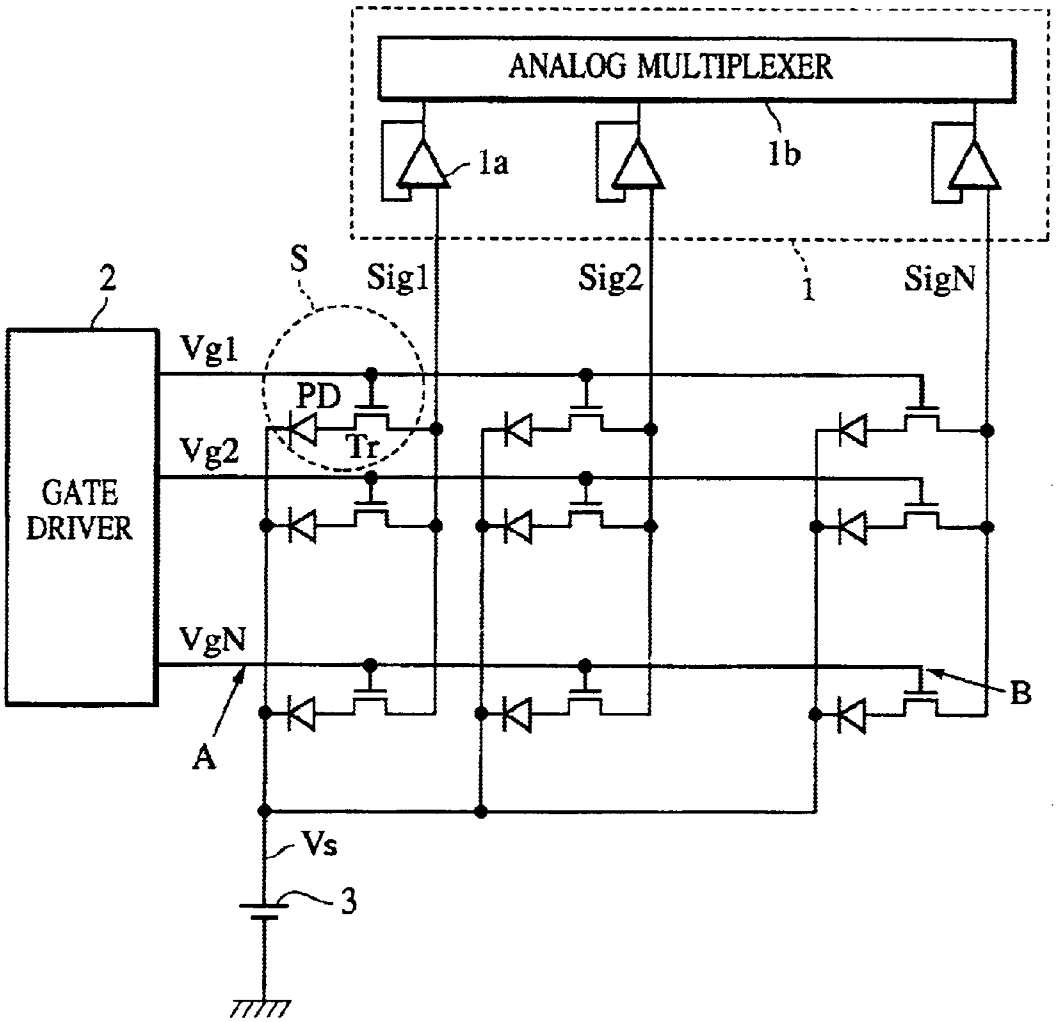
FIG. 1 is a schematic circuit diagram of an example of an area sensor having a photoelectric conversion element and a switching element in a pixel.
Figure 2A:
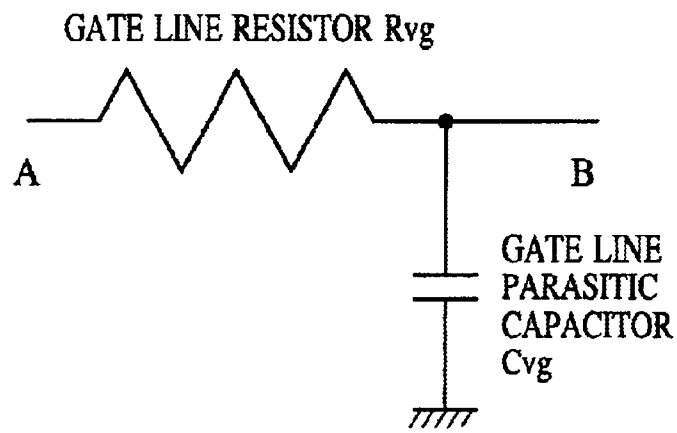
FIG. 2A is an equivalent circuit diagram of a gate line of the area sensor.
Figure 2B:
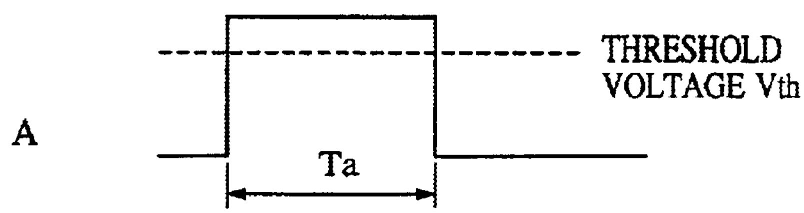
FIGS. 2B and 2C are conceptual diagrams of a driving waveform (gate pulse) at each point.
Figure 2C:
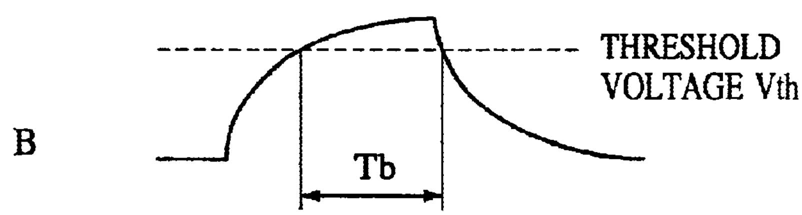
Figure 3:
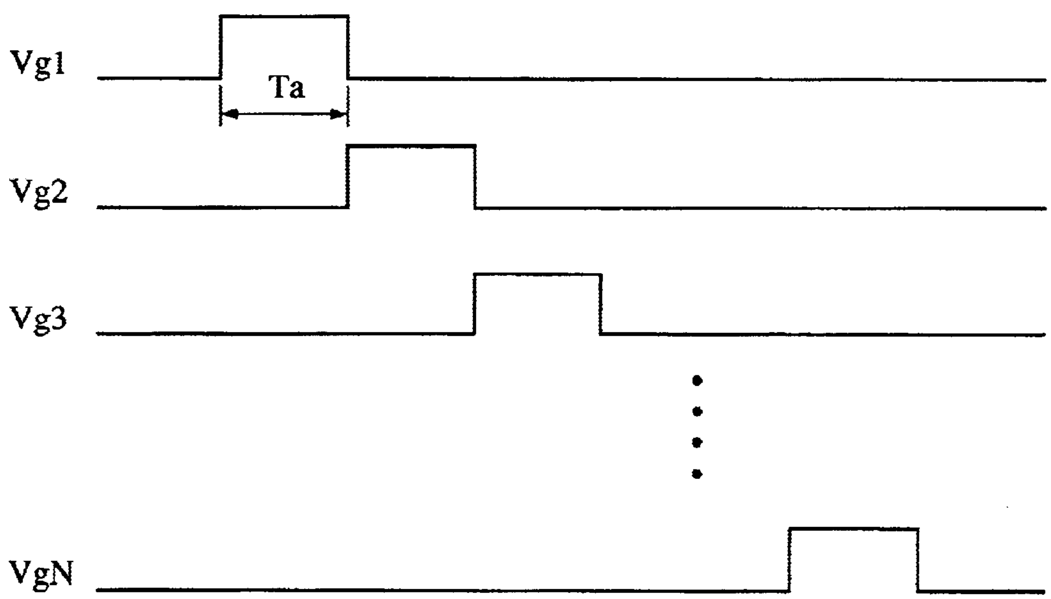
FIG. 3 is a timing chart illustrating an example of the driving of a gate driver in the area sensor.
Figure 4:
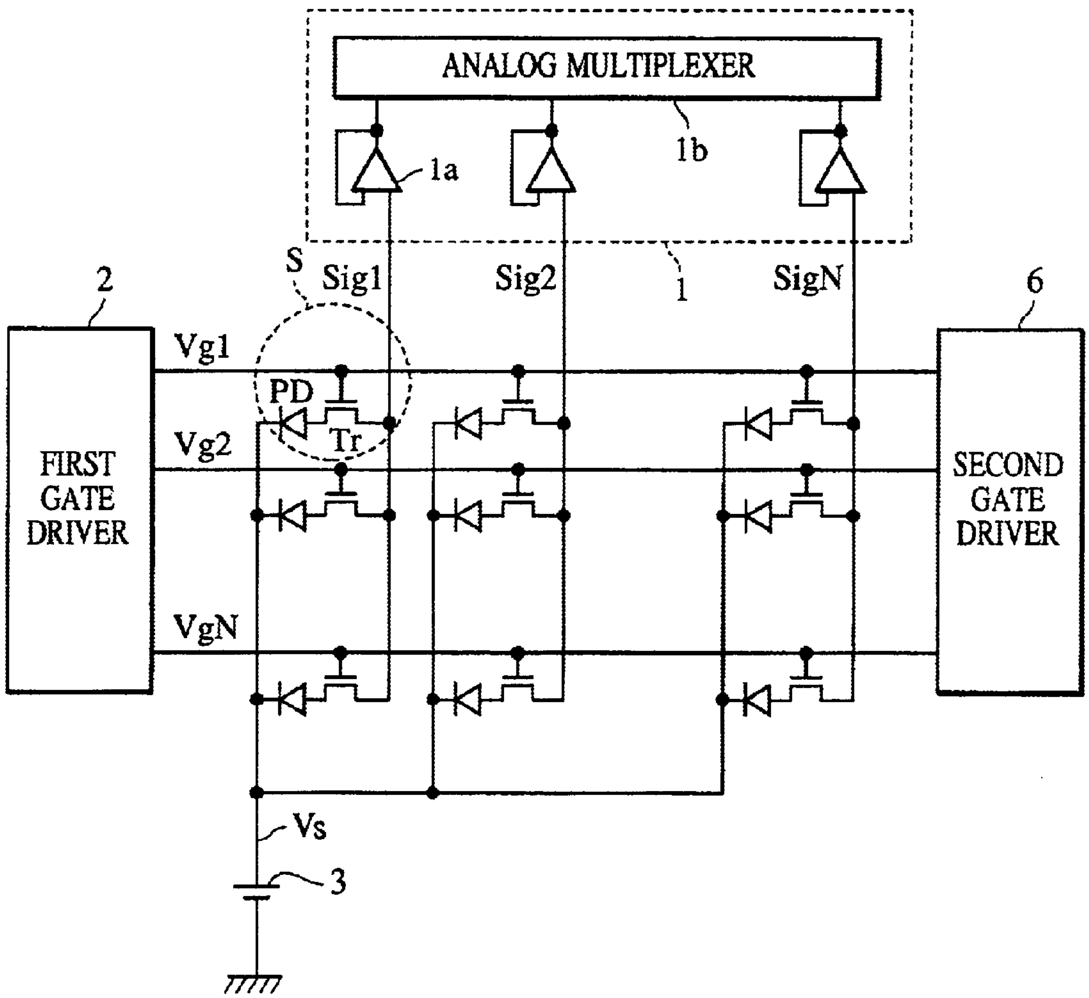
FIG. 4 is a schematic circuit diagram illustrating an example of an area sensor.
Figure 5A:
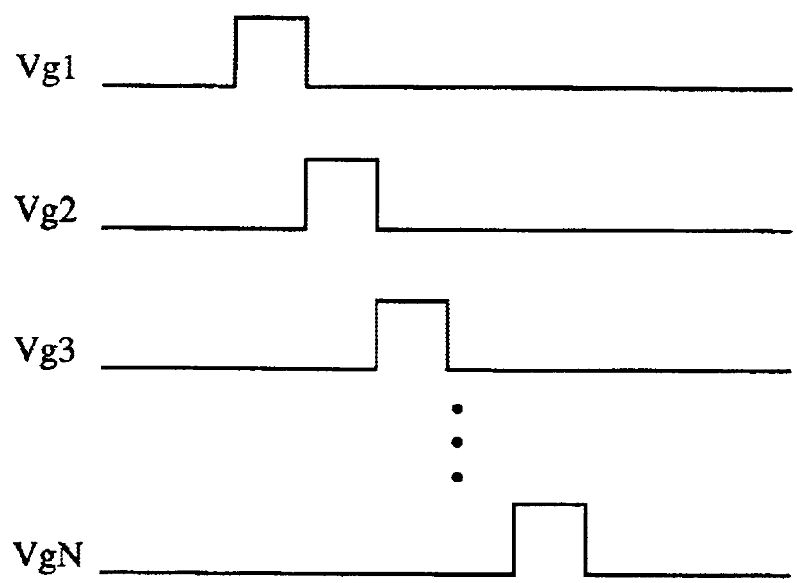
FIGS. 5A and 5B are timing charts illustrating an example of the operation of the area sensor.
Figure 5B:
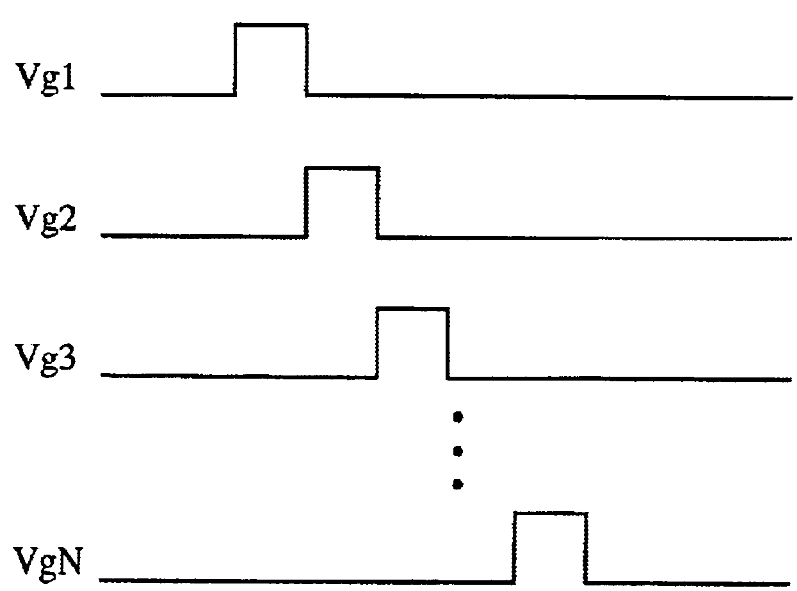

FIG. 4 is a schematic circuit diagram illustrating an example of an area sensor of the present invention. Components in FIG. 4 which are the same as those in FIG. 1 are given the same reference numerals. FIGS. 5A and 5B are each a timing chart illustrating an example of the operation of the area sensor in the first embodiment.

Similarly to that in the example shown in FIG. 1, each pixel S of the area sensor is formed of a photodiode PD and a thin-film transistor (TFT) Tr. The cathode electrode of the photodiode PD is connected to a bias line Vs, and a bias voltage is applied thereto by a power supply 3. The source electrodes of the thin-film transistors Tr are connected to the data lines Sig1 to SigN for each pixel column. The gate electrodes of the thin-film transistors Tr are connected to the gate lines Vg1 to VgN for each pixel row. The anode electrodes of the photodiode PD and the drain electrodes of the thin-film transistors Tr are connected to each other by pixels. Furthermore, each of the data lines Sig1 to SigN is connected to a reading apparatus 1 comprising an amplifier 1*a* and an analog multiplexer 1*b*. The point to be noted herein is that each of the gate lines Vg1 to VgN is connected to both a first gate driver 2 comprising a shift register and a second gate driver 6 disposed so as to oppose a side in which the gate driver 2 is disposed.

FIGS. 5A and 5B each show a timing chart of a gate pulse which is applied to the gate lines Vg1 to VgN by the first gate driver 2 and the second gate driver 6 in FIG. 4, respectively. As is clear from FIGS. 4, 5A, and 5B, in this embodiment, each of the gate lines Vg1 to VgN is connected to the first gate driver 2 and the second gate driver 6, and a gate pulse of the same pulse width is applied at the same time by the two gate drivers.

The driving timings of the two gate drivers can be synchronized by inputting the driving start signals (start signals) of the two gate drivers at the same time. It is of course more preferable that the driving be controlled in accordance with a common clock signal. The gate driver is provided with a start signal input section for receiving a driving start signal (start signal) so as to start driving.

With this construction, even if a disconnection occurs in the gate line, it is possible to apply a gate pulse from either one of the gate drivers. As a result, such a problem, as transferring of a signal from a pixel connected to the gate line cannot be performed and reading of image information becomes impaired, which is caused by a disconnection of the gate line, does not occur.

Furthermore, since a gate pulse is applied to each gate line at the same time, the resistance and the parasitic capacitance of the gate line are reduced substantially, and a delay in the gate pulse is reduced, thereby making higher-speed driving possible.

Examples of metal materials used for gate lines of the area sensor of the present invention, and examples of electric resistivity in a case where each is formed into a film are shown in Table 1 below.

TABLE 1

| Metal | Resistivity ($\mu\Omega \cdot$ cm) |
|---|---|
| Cr | 50 |
| Ti | 200 |
| Mo | 50 |
| Mo—Ta | 50 |

As can be seen from this Table, when chromium is used as the metal material for the gate line, the film thickness is set to 1000 Å, the wiring width is set to 10 $\mu$m, and the line length is set to 20 cm, the gate line resistance, that is, Rvg, reaches 100 kΩ. That is, in a case where chromium, titanium, molybdenum, a molybdenum-tantalum alloy, etc., is used for the wiring of the gate line, generally, the wiring resistance Rvg becomes several tens to hundreds of kΩ.

Also, there are cases in which the parasitic capacitance Cvg of the gate line generally becomes several tens to several hundreds of pF, and the time constant by Rvg and Cvg becomes several $\mu$s.

This cannot be ignored in view of higher speed because, for example, when the total number of gate lines is 1000, the delay time becomes several milliseconds in total. However, as a result of forming the construction of the present invention, each of Rvg and Cvg can be substantially reduced to ½, and the time constant is reduced to ¼.

Therefore, the present invention is particularly effective for a case in which the resistivity exceeds 10 $\mu\Omega\cdot$cm, such as when chromium, titanium, molybdenum, a molybdenum-tantalum alloy, etc., is used for the material of the metal wiring.

Figure 14A:
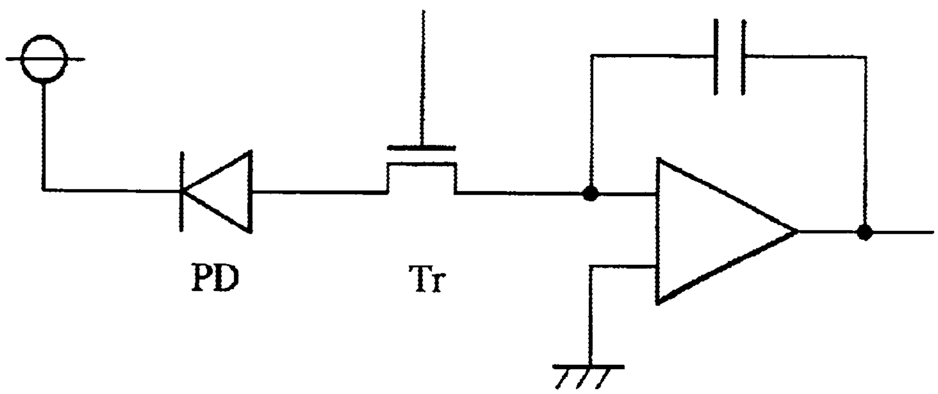
FIG. 14A is a schematic circuit diagram showing a reading device embodying a pixel.
Figure 14B:
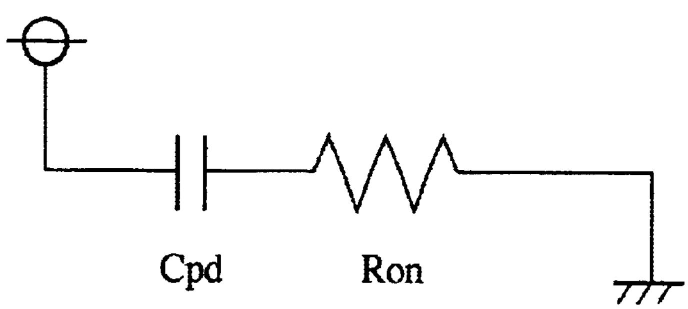
FIG. 14B is an equivalent circuit for charge transfer.
Figure 15:
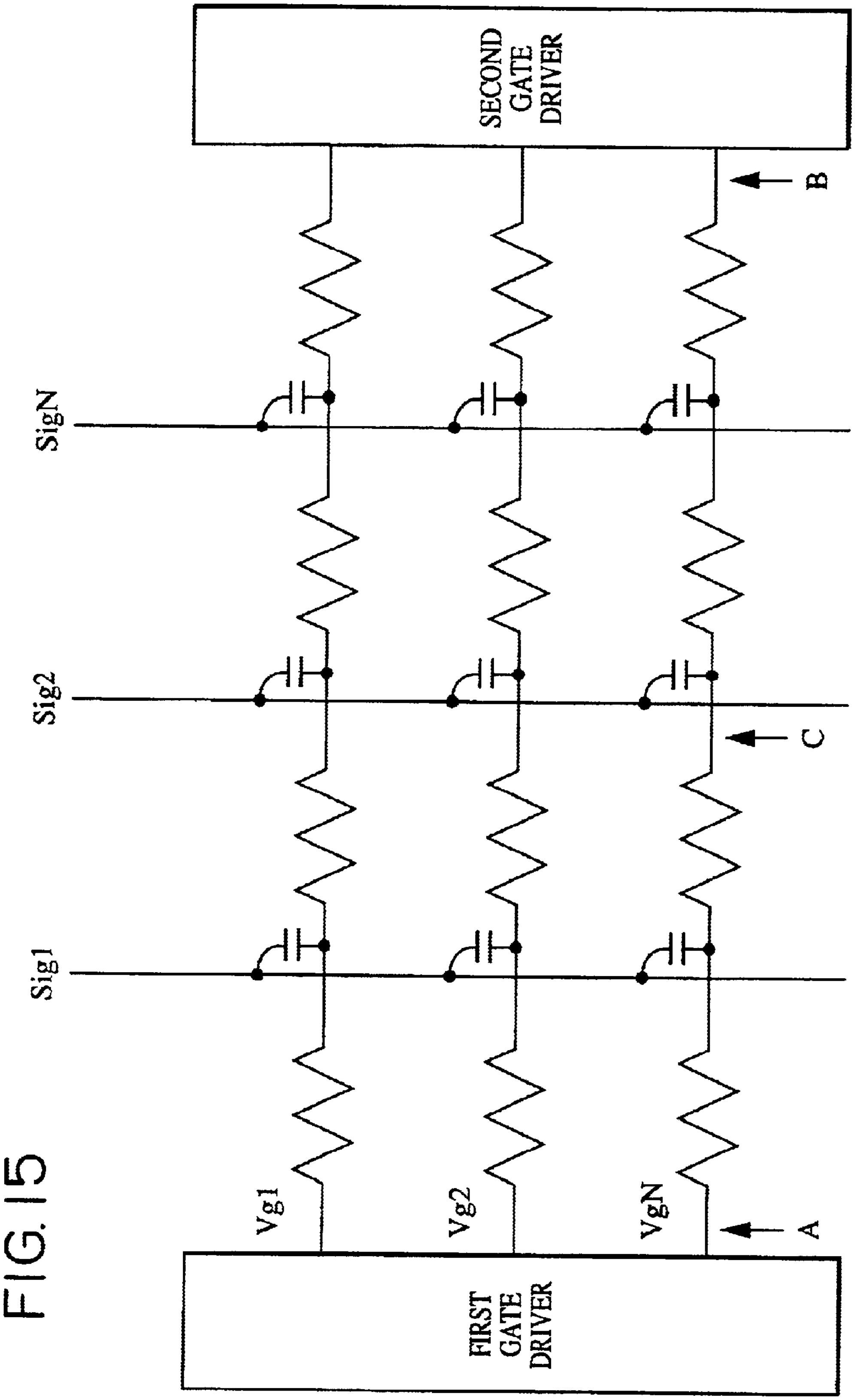
FIG. 15 is an equivalent circuit of the elements connected between the first and second gate drivers shown in FIG. 4.

As shown in FIG. 15, in order that a TFT be turned on and electric charge be transferred, a fixed time period Tb or more is necessary. As shown in FIGS. 14A and 14B, this time period Tb is determined by a time constant $\tau$1 which is a product of the capacitance Cpd and the on-resistance Ron of the TFT of the photoelectric conversion element PD. FIG. 14A shows a pixel and a reading device, and FIG. 14B shows an equivalent circuit for charge transfer.

On the other hand, the rounding of the pulse waveform of the gate line, such as that shown at C in FIG. 15, is determined by a time constant $\tau$2 which is a product of the resistance Rvg and the parasitic capacitance Cvg of the gate line Vg. In this embodiment, it is preferable that a gate pulse be applied from both ends of the gate line, and the following relation be satisfied:

$\tau 1 \geqq \tau 2$

That is, as a result of realizing the relation of $\tau 1 \geqq \tau 2$ in this manner, it is possible to substantially prevent the rounding of the gate pulse from exerting a large influence on the overall speed.

Rvg described herein can be determined by measuring the resistance across both ends (point A and point B in FIG. 15) of the gate line. Also, Cvg is a lumped-constant-related parasitic capacitance of the gate line. When Cvg and Rvg cannot be directly measured, as shown in FIG. 15, it is possible to observe the waveform of the gate pulse at the center (point C) of the gate line and to determine the time constant $\tau 2$ therefrom.

Furthermore, the present invention is effective in reducing noise. That is, thermal noise corresponding to the resistance occurs in the gate line. Furthermore, as shown in FIG. 15, the gate line Vg and the data line Sig are capacitively coupled. This shows that the thermal noise of the gate line propagates to the data line via the capacitive coupling, causing random noise. In the present invention, Rvg is substantially reduced by driving the gate line from both sides. That is, the influence of the thermal noise arising from Rvg is reduced.

<Second Embodiment>

Figure 6:
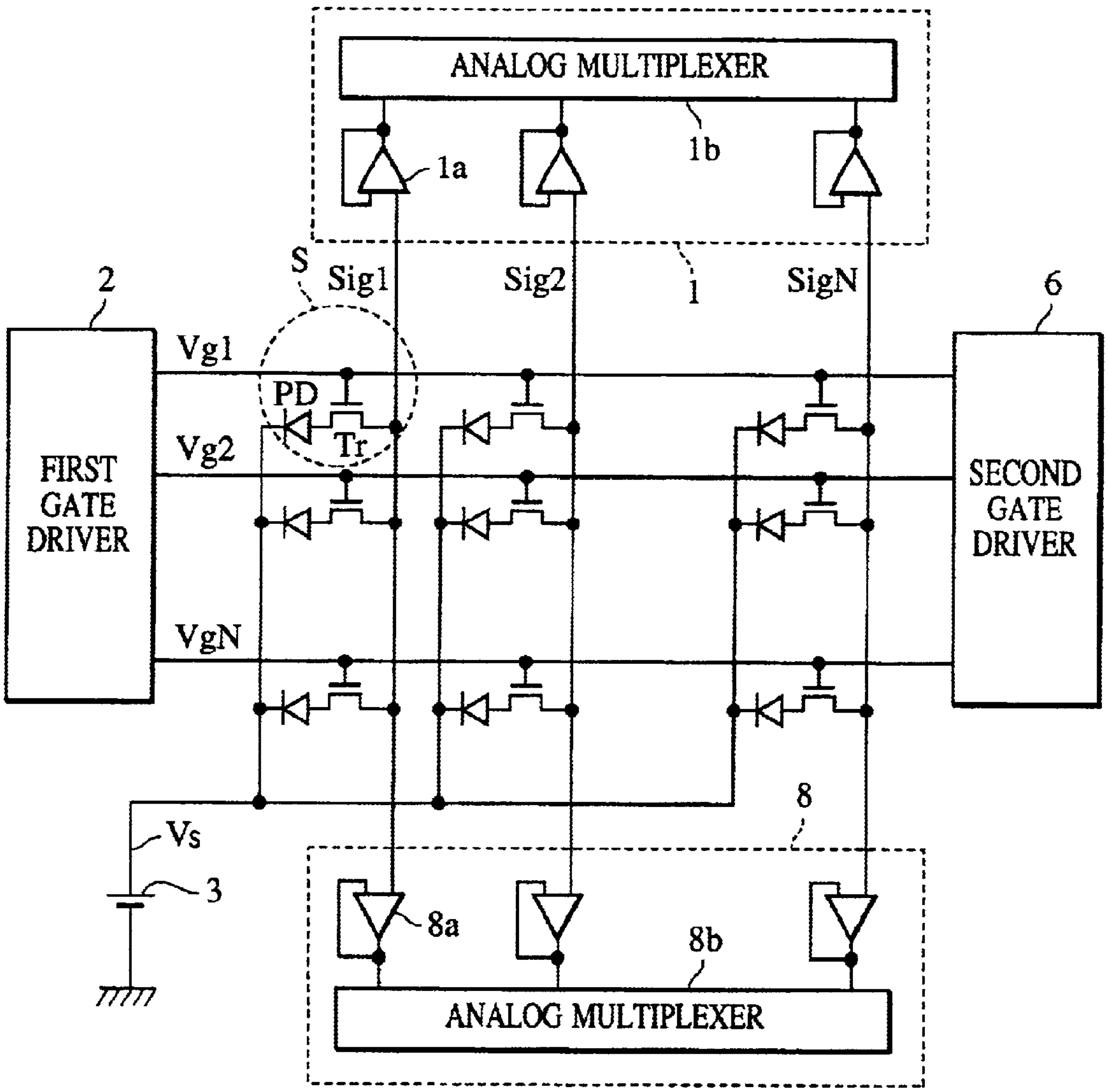
FIG. 6 is a schematic circuit diagram illustrating an example of an area sensor.

FIG. 6 is a schematic circuit diagrams illustrating another example of an area sensor of the present invention. Components in FIG. 6 which are the same as those in FIG. 1 are given the same reference numerals.

Also in this embodiment, in a manner similar to the above-described first embodiment, each of the gate lines Vg1 to VgN of the area sensor is connected at its one end to the first gate driver 2 and is connected at the opposing other end to the second gate driver 6. As described in FIGS. 5A and 5B, a gate pulse is applied from the two gate drivers 2 and 6 at the same time.

Furthermore, in this embodiment, in addition to the gate lines Vg1 to VgN, each of the data lines Sig1 to SigN is connected at its one end to the first reading apparatus 1 and is connected at the opposing other end to a second reading apparatus 8. The second reading apparatus 8 comprises an amplifier 8*a* and an analog multiplexer 8*b* in a manner similar to the first reading apparatus 1.

Data which are read through data lines and which are photoelectrically converted by pixels are output to the respective analog multiplexers via the amplifier 1*a* and the amplifier 8*a*.

With such a connection construction, even if a disconnection occurs in the gate line or the data line, since a signal can be supplied and read, impairment due to a disconnection does not occur. That is, in a case where a disconnection occurs in the data line, the data from the pixel in FIG. 6 in a portion after the disconnection can be read from the first reading apparatus 1, and the data from the pixels in a portion before the disconnection can be read from the second reading apparatus 8. The reading timing of the first reading apparatus 1 may be the same as or may be different from the reading timing of the second reading apparatus 8.

Since the resistance and the parasitic capacitance can be decreased substantially by performing the driving of the gate lines at the same time as described in the first embodiment, high-speed driving is made possible. Furthermore, when the gate line is disconnected, a driving signal is supplied from any one of the gate drivers, and therefore, a problem as a result of a disconnection in the gate line does not occur.

<Third Embodiment>

Figure 7:
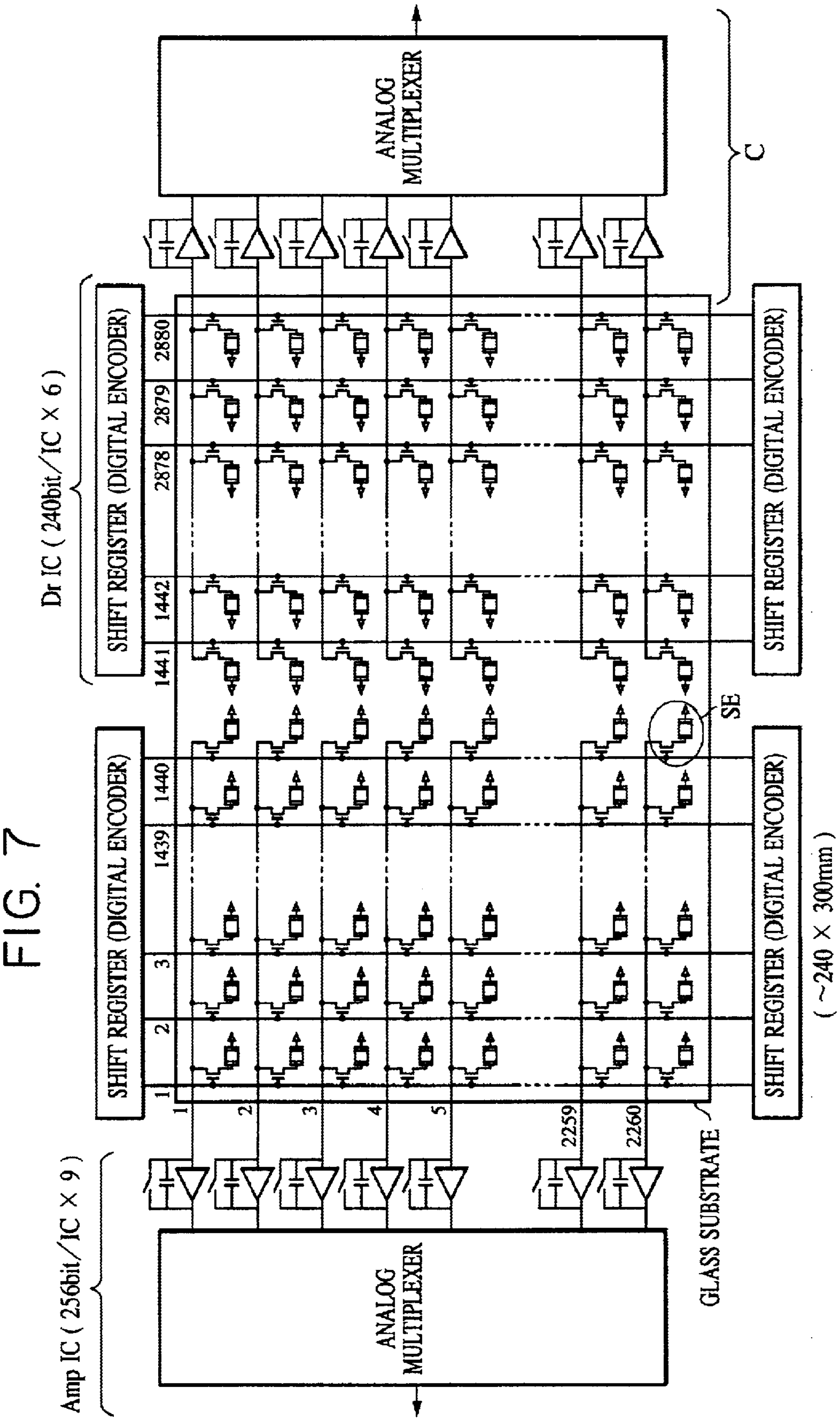
FIG. 7 is a schematic circuit diagram of an example of the construction of a photoelectric-conversion-element panel section, which is an area sensor.

FIG. 7 is a schematic diagram showing an example of the construction of a photoelectric-conversion-element panel section, which is an area sensor, provided within an X-ray photographing apparatus of an X-ray photographing system.

In the photoelectric-conversion-element panel, pixels SE having a pair of photoelectric conversion element and thin-film transistor for transferring electric charge are formed in an arrayed form on a substrate in which at least the surface thereof has insulating properties, such as a glass substrate. For a signal which carries image information from each pixel, a group of pixels arrayed two-dimensionally is divided into two right and left areas in FIG. 7, and a plurality of common signal lines (data lines) are extended to the right and left for each area.

In FIG. 7, a plurality of common gate lines (gate lines) are provided in the vertical direction, and two shift registers (serving as gate drivers) for driving gates are connected to the upper and lower end portions of each common gate line. The shift registers disposed in the upper and lower portions are driven at the same timing by a control circuit (not shown) and operate so as to apply a coincidence gate pulse to one gate line.

In this embodiment, the gate lines are divided into a pixel group which is divided into two groups, and are formed of a group of gate lines (1 to 1440) corresponding to the group of pixels in the left half in the figure and a group of gate lines (1441 to 2880) corresponding to the group of pixels in the right half. One gate line is selected from each group of gate lines, and a gate pulse is supplied thereto. Therefore, when seen in the entirety of the photoelectric conversion panel, the construction is formed in such a way that a gate pulse is applied to two gate lines at the same time, and the electric charge transferred thereby can be processed simultaneously by two sets on the right and left of an amplifier and multiplexer group (serving as a reading apparatus) formed of a circuit having an amplifier and multiplexer group.

With this construction, only a half time is required to read the entire surface of the panel, and the length and the capacity of the common signal line can be substantially reduced by a half. Therefore, it is possible to construct an X-ray photographing system with a high sensitivity, which is capable of performing high-speed reading with a small amount of noise.

One shift register is formed of, for example, six ICs (240 bit/IC). In the surrounding of the image receiving area, that is, in an upper right portion, an upper left portion, a lower right portion, and a lower left portion in the figure, a shift register is provided, and a total of four shift registers are disposed. Therefore, a total of 24 ICs used in the shift registers are disposed in the surrounding.

The reading apparatus, in practice, has an amplifier IC in which the functions of both an amplifier and a multiplexer are integrated. Nine amplifier ICs (a total of 18) are disposed in each of the right and left to the image pickup area. Amplifier ICs (AmpIC) (256 Amp/IC) are provided so as to correspond to the 256 data lines. For the amplifier IC in the embodiment, a current-integrating-type is used. Furthermore, the portion (the portion of the reading apparatus) of a group of amplifier ICs having an amplifier and a multiplexer, indicated by C in the figure, may be, for example, of three connection types such as those described below.

Figure 8:
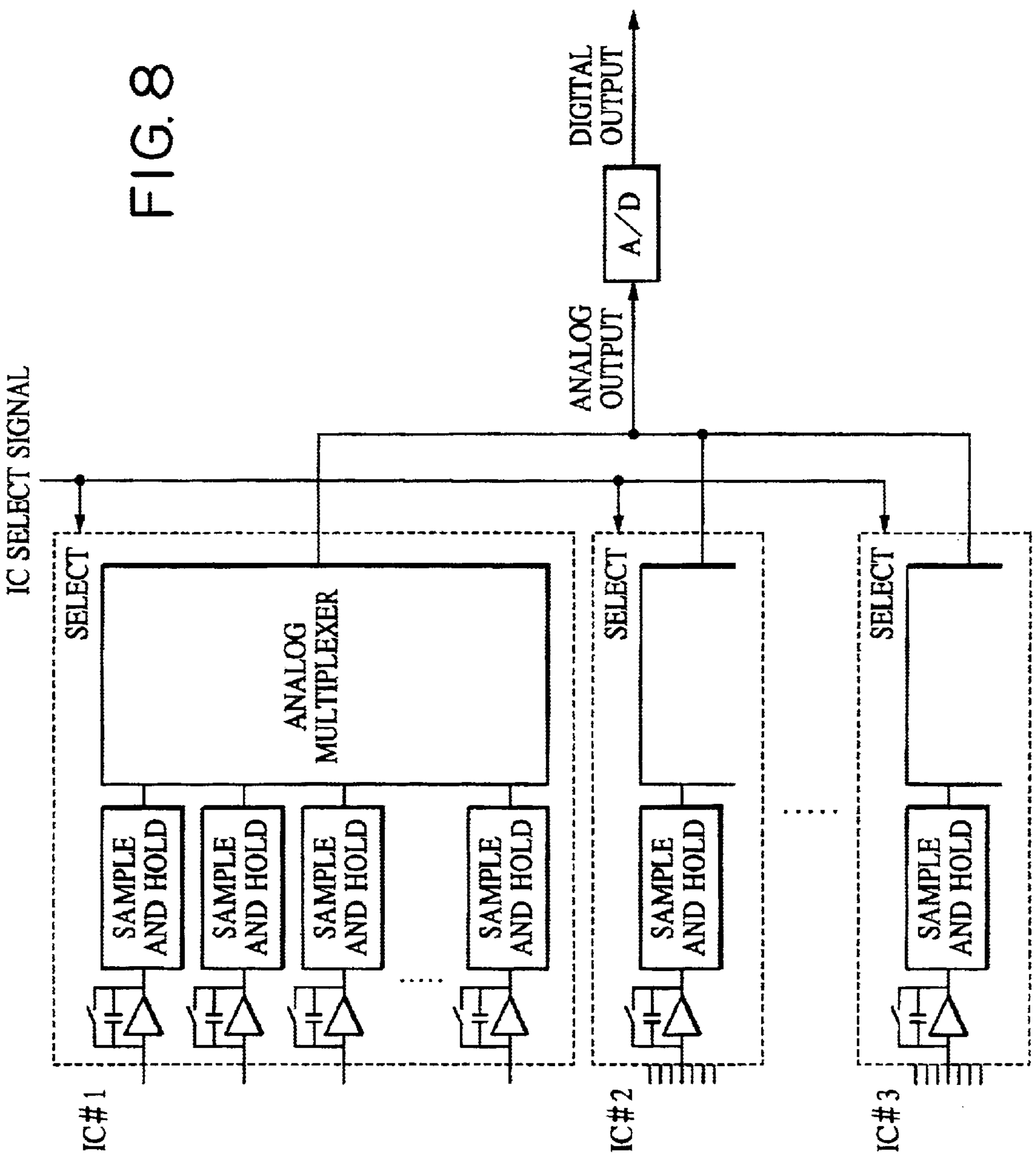
FIGS. 8, 9, and 10 are each a conceptual circuit diagram illustrating the circuit construction of a reading apparatus part.
Figure 9:
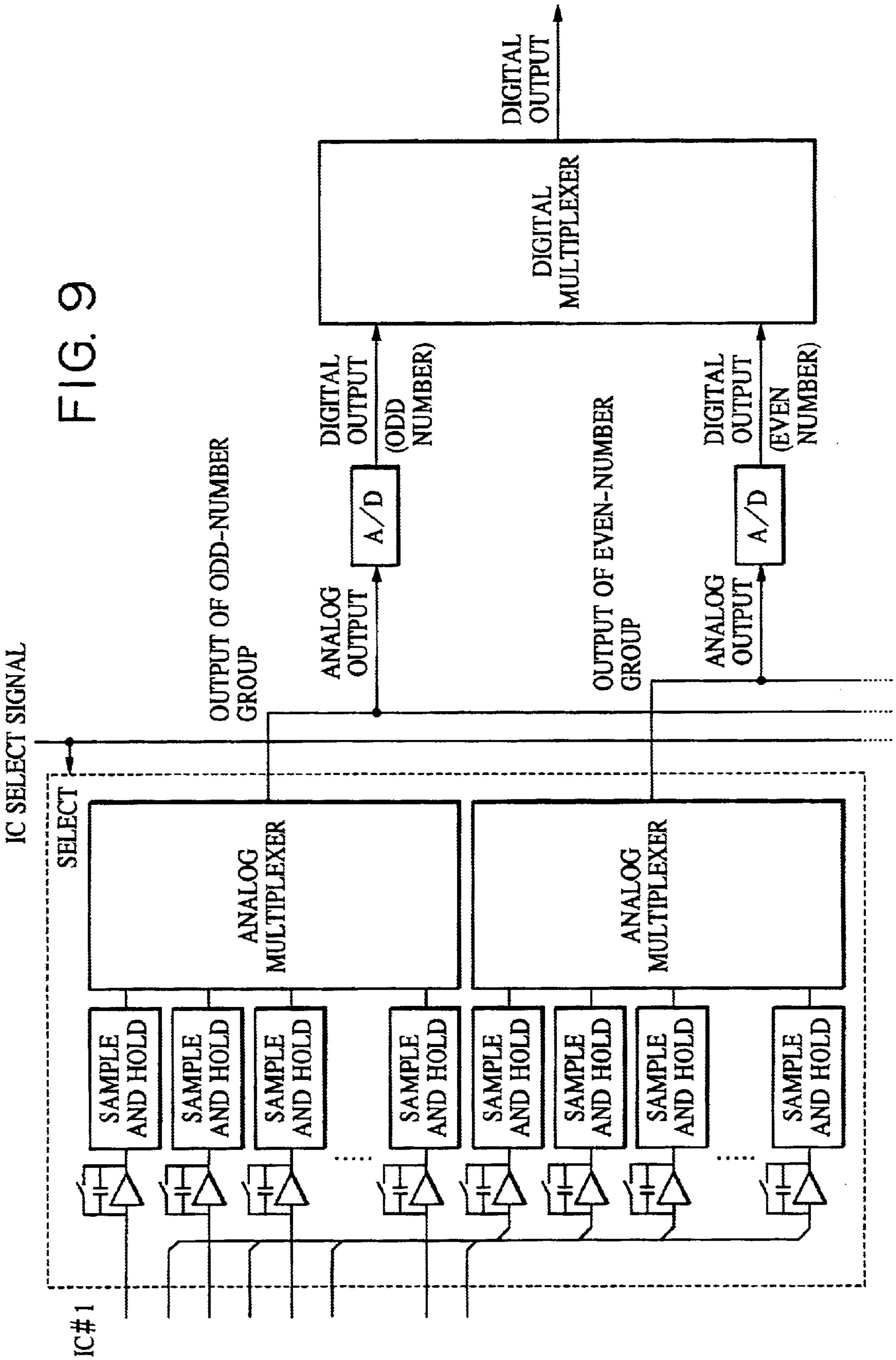
Figure 10:
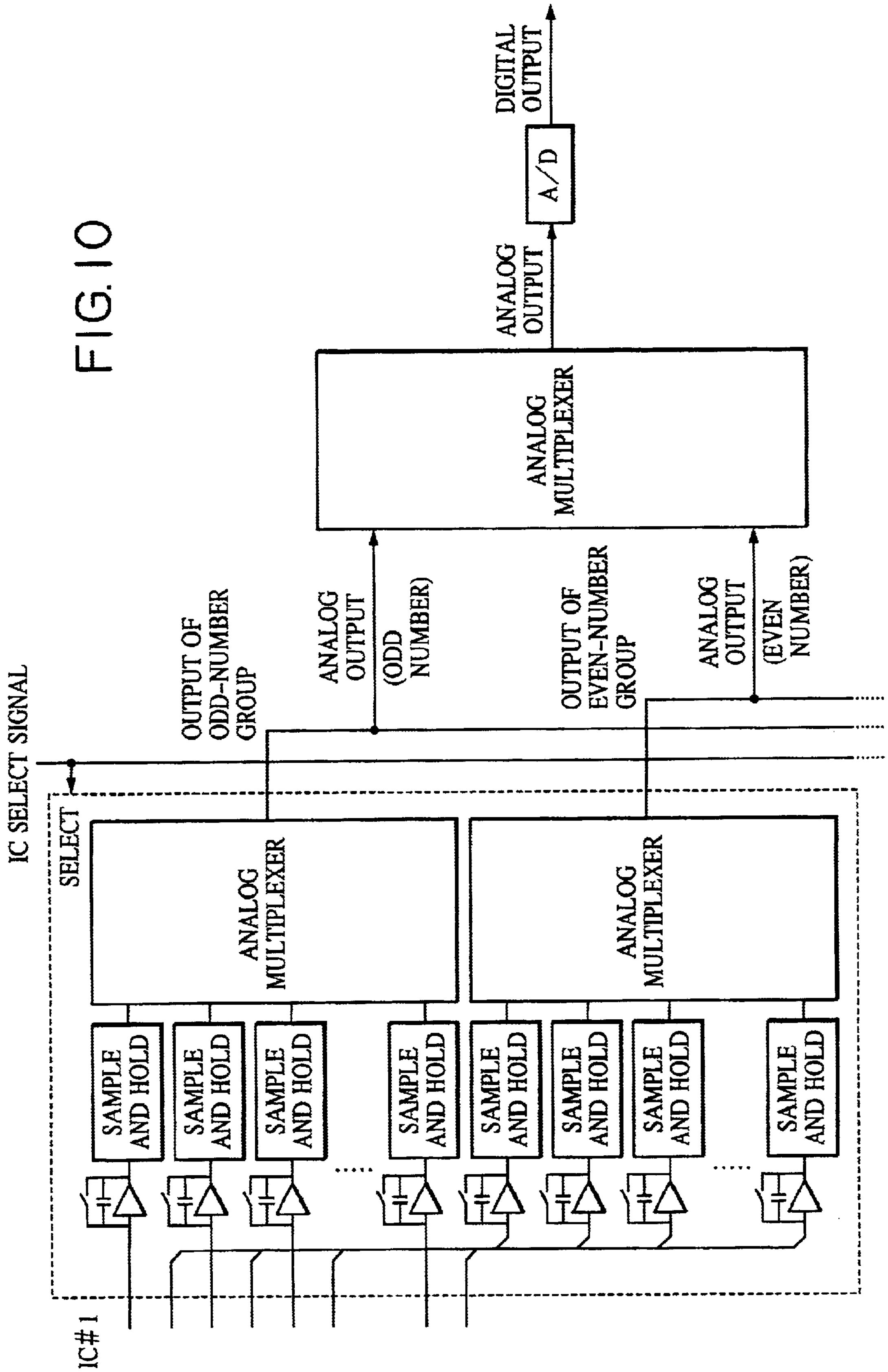

Examples of schematic circuit constructions of the three types are shown in FIGS. 8, 9 and 10.

FIG. 8 shows that the outputs of nine amplifier ICs are connected to one and is input to one A/D conversion circuit. The output of each amplifier IC is controlled in accordance with an IC select signal, and the output of any one of the amplifier ICs is input to the A/D conversion circuit. The analog output which is input to the A/D conversion circuit is converted into a digital signal thereby and is output. Herein, although a plurality of amplifier ICs are used, one large multiplexer (2260 inputs and 1 output) is formed as a whole.

Next, the circuit construction shown in FIG. 9 is described. Herein, data lines for transferring a sensor signal are connected to each of the amplifiers which are divided into an odd-number group and an even-number group of the data lines. The output from each amplifier is sent to an analog multiplexer corresponding to amplifiers (or data lines) of the odd-number group and the even-number group through a sample-and-hold circuit in a manner similar to the circuit construction shown in FIG. 8. Therefore, the amplifier ICs having an amplifier and a multiplexer are disposed so as to correspond to the odd number or the even number of the data lines, and two analog signals of the output of the odd-number group and the output of the even-number group are output from the amplifier ICs independently of each other. The output of the odd-number group and the output of the even-number group are connected so as to be input to the A/D conversion circuits corresponding to the odd number and the even number, respectively.

As a result, in the construction shown in FIG. 9, in the amplifier ICs of the odd-number group and the amplifier ICs of the even-number group, two types of multiplexers corresponding to the odd-number group and the even-number group are formed. The digital outputs from the respective A/D conversion circuits corresponding to the odd number and the even number are combined by a digital multiplexer and is output as one continuous digital signal.

In FIG. 10, in a manner similar to that in FIG. 9, two analog signals separated for the odd-number group and the even-number group are output from the amplifier ICs. Here, the analog outputs corresponding to the even-number group and the odd-number group are input to one analog multiplexer (2 inputs and 1 output), whereby one analog output is obtained. This is considered in such a way that one large multiplexer (2260 inputs and 1 output) is formed in a manner similar to that in FIG. 8. The analog output from the analog multiplexer is input to the A/D conversion circuit, whereby it is converted into a digital output and is output as a signal.

Figure 11:
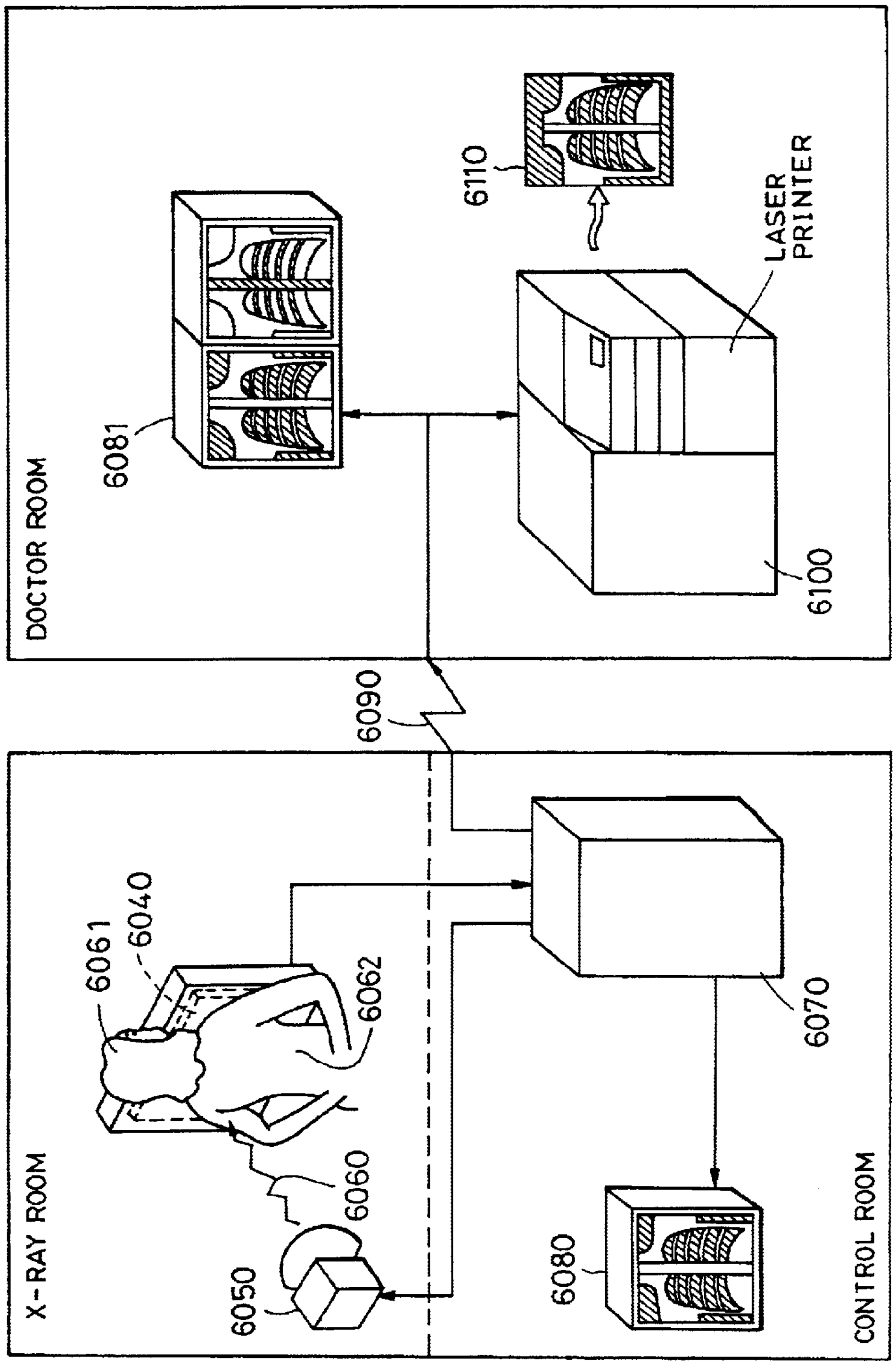
FIG. 11 is a system configuration diagram illustrating an application example of an image input apparatus.
Figure 12:
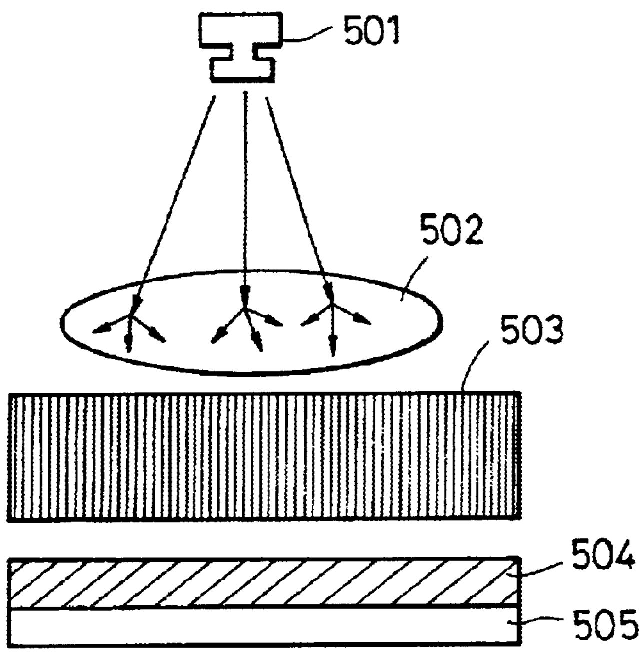
FIG. 12 is a schematic diagram of the image input apparatus.

FIG. 11 shows an example in which an image input apparatus having the area sensor shown in FIG. 7 is applied to an X-ray photographing system. FIG. 12 shows an example of a case in which X rays of an X-ray photographing apparatus using an area sensor are wavelength-converted into a wavelength which can be detected by the area sensor.

FIG. 11 is a diagram showing an example of the application of an X-ray photographing apparatus using an area sensor of the present invention into an X-ray photographing system.

X rays 6060 which are generated in an X-ray tube 6050 as an electromagnetic-wave generation source is transmitted through an observed portion 6062, such as the chest of a patient or subject 6061, and enters an area sensor (photoelectric conversion device) 6040 having mounted in the upper portion thereof a scintillator as a wavelength conversion member. These incident X rays contain information of the interior of the subject 6061. In response to the incidence of the X rays, the scintillator emits light. This is photoelectrically converted to obtain electrical information. This information is converted into digital form, image processing is performed thereon by an image processor 6070, and this can be observed by a display 6080 in a control room.

Furthermore, this information can be transferred to a distant place by transmission means, such as a telephone line or wireless 6090, and it is possible for a doctor at a remote location to perform diagnosis by using a display on a display 6081 or by using an output on a film at a doctor room of another place. The obtained information can also be recorded or stored in a recording medium using various types of recording materials, such as an optical disk, an magneto-optical disk, or a magnetic disk, and a recording medium 6110, such as a film or paper, by recording means 6100, such as a film processor.

The above-described X-ray photographing apparatus is not particularly limited to that for medical purposes and can also be used in applications, such as nondestructive examinations, etc.

In the X-ray photographing apparatus used for nondestructive examinations, such as medical diagnoses and interior examinations, a subject, such as a human body, is irradiated with X rays, and the X rays which are transmitted through the subject are converted by a wavelength conversion member, such as a fluorescent member, into light which can be detected by an area sensor, and the light is irradiated to a photoelectric conversion section, such as a photoelectric conversion device so that the light is converted into an electrical signal which carries image information.

FIG. 12 is a schematic diagram showing an example of such an X-ray photographing apparatus. In FIG. 12, reference numeral 501 denotes an X-ray source. Reference numeral 502 denotes a subject, such as a human body (patient), with which the X rays emitted from the X-ray source 501 are irradiated. Reference numeral 503 denotes a grid, in which substances which absorb X rays and substances through which X rays are transmitted are alternately disposed, for removing the scattered X-ray components and improving the resolution. Reference numeral 504 denotes a wavelength conversion member which is provided so that the irradiated electromagnetic wave is converted in wavelength to light of a wavelength which can be sensed by the photoelectric conversion element. Normally, for this member, a scintillator which absorbs X rays and which emits light of a wavelength which can be photoelectrically converted by the photoelectric conversion element is used, and more specifically, fluorescent substances, such as CsI (cesium iodide) or $Gd_2O_2S$, may preferably be used. Reference numeral 505 denotes an area sensor for receiving light from the wavelength conversion member 504. The area sensor of the present invention can be applied to this part.

Regarding the construction of the area sensor, as described above, an area sensor in which photoelectric conversion elements are arranged in a matrix, which is commonly known, can be used. For example, an area sensor having a construction such as that disclosed in, for example, Japanese Unexamined Patent Application Publication No. 8-116044, may be used.

Figure 13:
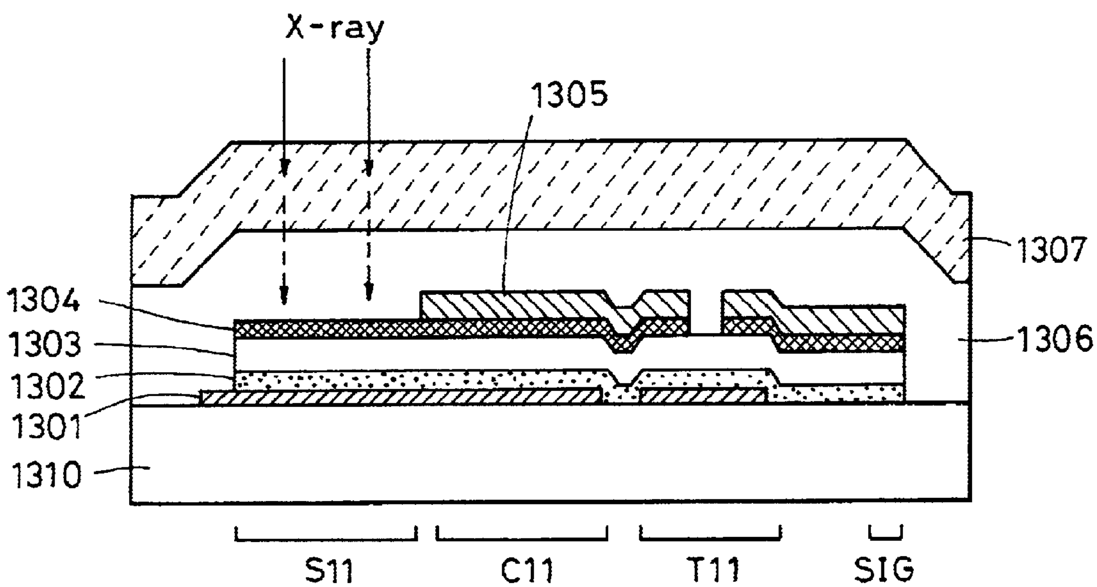
FIG. 13 is a schematic sectional view illustrating an example of an area sensor pixel part.

For example, as shown in FIG. 13, a photoelectric conversion element S11 having a first electrode 1301, an insulation layer 1302, a photoconductive layer 1303 such as amorphous silicon, an ohmic contact layer 1304, and an electrode layer 1305 in this order on a substrate 1310, such as glass, in which at least the surface thereof has insulating properties has a construction in which each layer is multi-layered in the same order as that of a thin-film transistor element (TFT) T11. Therefore, these elements can be formed on one substrate at the same time. The first electrode 1301 of the photoelectric conversion element S11 is used for the gate electrode of the TFT, the insulation layer 1302 is used for the gate insulation film, the photoconductive layer 1303 is used for a semiconductor layer, the ohmic contact layer 1304 such as an $n^+$ layer is used for an ohmic contact layer, and the electrode layer 1305 is used for a source or drain electrode.

Furthermore, in FIG. 13, reference numeral 1306 denotes a protective layer such as silicon nitride (SiN), and reference numeral 1307 denotes a wavelength conversion member such as cesium iodide (CsI). Reference letters SIG denote a data line.

A case in which pixels are formed by elements of the same multilayered construction such as that described above is effective in the formation of a large area of the image receiving area and in the reduction of manufacturing costs. Furthermore, in the photoelectric conversion element of the above-described construction, when X rays having image information enter, electric charge corresponding thereto is generated, and the electric charge can be stored in the element, it is also possible to read the information in a nondestructive manner, and this is preferable in that it is possible to deal with a variety of variations of driving methods.

As has thus been described, according to the present invention, it is possible to provide a highly reliable area sensor in which there is no defective driving such as that which occurs due to a disconnection of wiring which crosses an image receiving area such as gate lines and data lines, and in which there is no impairment such as inability to obtain data, and in which image information can be output stably, to provide an image input apparatus having the area sensor, and to provide a method of driving the area sensor.

Furthermore, according to the present invention, it is possible to realize an area sensor which can be driven at high speed because a desired driving waveform can be supplied, and as a result which is suitable for obtaining a moving image, to realize an image input apparatus having the area sensor, and to realize a method of driving the area sensor.

In addition, according to the present invention, it is possible to provide an area sensor having an image receiving area which is larger, an image input apparatus having the area sensor, and a method of driving the area sensor, and to provide an area sensor, in which a driving speed is not decreased due to the larger area, or in which driving speed can be improved, the decrease in the driving speed being minimized in comparison with a case in which area sensors having an image receiving section of a small area are combined, and higher definition reading and display being made possible, to provide an image input apparatus having the area sensor, and to provide a method of driving the area sensor.

According to the present invention, since the signal reading means comprises an amplifier IC having an amplifier provided individually for each data line, and an analog multiplexer; and an A/D converter, it is possible to realize an area sensor capable of reading a signal at high speed and with high accuracy.

According to the present invention, since the output of each amplifier IC can be selected and controlled in accordance with a select signal, it is possible to realize an area sensor capable of reading a signal at a desired sequence.

According to the present invention, since the outputs of each amplifier IC are formed differently for the even-number group and the odd-number group, it is possible to realize an area sensor capable of reading a signal at a higher speed.

According to the present invention, since the outputs of each amplifier IC are formed differently for the even-number group and the odd-number group so as to perform a multiplexing operation (selection operation), it is possible to realize an area sensor in which the rearrangement of signals is not necessary and image processing is easy.

In addition, according to the present invention, it is possible to reduce random noise arising from the wiring resistance of the gate line and to realize a higher S/N ratio.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An area sensor comprising:

plural pixels, each having a switching element, arranged two-dimensionally; and plural common lines which are connected to the switching elements corresponding to said plural pixels which are arrayed in a direction, wherein plural driving means, connected to said plural common lines, apply a control signal to said plural common lines in order to drive the switching element of each of said plural pixels, wherein, in order to allow the plural driving means to be driven at the same time, the plural driving means have a start signal input section for starting the plural driving means.

2. An area sensor according to claim 1, wherein each of the plural driving means is connected to both ends of said plural common lines.

3. An area sensor according to claim 2, wherein said control signal is applied, at the same timing, by each of the plural driving means which are connected to both ends of said plural common lines.

4. An area sensor according to claim 1, wherein each of the switching elements of said plural pixels is a thin-film transistor, and each of said common lines is a common gate line which is connected to the gate of the thin-film transistor.

5. An area sensor according to claim 4, wherein each of said plural pixels has a photoelectric conversion element which is connected to the thin-film transistor.

6. An area sensor according to claim 1, wherein a wavelength conversion member is disposed in each of said plural pixels.

7. An area sensor comprising:

plural pixels, each having a thin-film transistor and a photoelectric conversion element, arranged two-dimensionally; and plural common source lines which are connected to source electrodes of the thin-film transistors which are arrayed in a direction, wherein plural signal reading means are connected to said plural common source lines, and wherein signal reading is performed, at the same timing, by the plural signal reading means.

8. An area sensor comprising:

plural pixels, each having a thin-film transistor and a photoelectric conversion element, arranged two-dimensionally;

plural common gate lines, connected to the gate electrodes of the thin-film transistors, which are arrayed in one direction; and plural common lines, connected to the source or drain electrodes of the thin-film transistors, which are arrayed in another direction, wherein plural signal reading means are connected to said plural common lines, and plural gate driving means are connected to said plural common gate lines, and wherein signal reading is performed, at the same timing, by each of the plural signal reading means.

9. An area sensor according to claim 8, wherein each of the plural signal reading means is connected to both ends of said plural common lines.

10. An area sensor according to claim 8, wherein each of the plural gate driving means is connected to both ends of said plural common gate lines.

11. An area sensor according to claim 8, wherein each of the plural signal reading means is connected to both ends of said plural common lines, and each of the plural gate driving means is connected to both ends of said plural common gate line.

12. An area sensor according to claim 11, wherein a control signal is applied, at the same timing, by each of the plural gate driving means.

13. An area sensor according to claim 8, wherein each of the thin-film transistors comprises amorphous silicon.

14. An area sensor according to claim 8, wherein each of the photoelectric conversion elements comprises a material selected from the group consisting of amorphous selenium, lead(II) iodide ($PbI_2$), and gallium arsenide.

15. An area sensor according to claim 8, wherein a wavelength conversion member is disposed in each of the photoelectric conversion elements.

16. An area sensor according to claim 8, wherein each of the plural gate driving means or each of the plural signal reading means is anisotropically connected to said plural common gate lines or said plural common source lines.

17. A method of driving an area sensor having plural pixels, each having a switching element, arranged two-dimensionally, and having a pixel sequence in which the switching elements are connected to a common line, said method comprising the steps of:

applying a control signal, from plural driving means, for driving the switching elements at the same time from at least two different points of the common line; and driving the switching elements which are connected to the common line in accordance with the control signal applied to common line, wherein a start signal from a start input section of the plural driving means is provided in order to allow the plural driving means to be driven at the same time.

18. A method of driving an area sensor according to claim 17, wherein the control signal, which is applied at the same time, has a same application time period.

19. A method of driving an area sensor according to claim 17, wherein the control signal which is applied to the common line is applied from portions near the ends of the common line.

20. An image input apparatus comprising:

an area sensor having plural pixels arranged two-dimensionally, each pixel having a thin-film transistor and a photoelectric conversion element, having plural common gate lines which are connected to the gate electrodes of the thin-film transistors arrayed in one direction and plural common lines which are connected to the source or drain electrodes of the thin-film transistors arrayed in another direction, having plural signal reading means connected to the common lines, having plural gate driving means connected to the common lines, and having a wavelength conversion member in the photoelectric conversion element;

an electromagnetic-wave generation source;

image processing means for processing an image signal from the area sensor; and display means for displaying an image on which image processing is performed, wherein signal reading is performed, at the same timing, by each of the plural signal reading means.

21. An image input apparatus according to claim 20, wherein a grid is provided between said area sensor and said electromagnetic-wave generation source.

22. An area sensor according to claim 7, wherein each of the plural signal reading means comprises an amplifier IC having an amplifier provided individually for each data line, and an analog multiplexer, and an A/D converter.

23. An area sensor according to claim 7, wherein each of the plural signal reading means comprises an amplifier IC having an amplifier provided individually for each data line, and an analog multiplexer; an A/D converter; and a digital multiplexer.

24. An area sensor according to claim 22, wherein the signal reading means comprises a plurality of amplifier ICs, and the output of each amplifier IC can be selected and controlled in accordance with a select signal.

25. An area sensor according to claim 22, wherein in the signal reading means, the amplifier IC has at least two analog outputs of the even-number group and the odd-number group.

26. An area sensor according to claim 25, wherein the signal reading means has A/D converters corresponding to the respective analog outputs of the even-number group and the odd-number group of the amplifier IC.

27. An area sensor according to claim 26, wherein, in the signal reading means, the outputs of the A/D converters corresponding to the even-number group and the odd-number group are connected to the digital multiplexer.

28. An area sensor according to claim 25, wherein a second analog multiplexer for inputting and switching the analog outputs of the even-number group and the odd-number group is provided, and the output of the second analog multiplexer is connected to the A/D converter.

29. An area sensor according to claim 27, wherein the output signals of the digital multiplexer or the second analog multiplexer is controlled in such a manner as to be positionally continuous.

30. An area sensor according to claim 8, wherein the resistivity of a material for the common gate line is 10 $\mu\Omega\cdot$cm or more.

31. An area sensor according to claim 8, wherein the material for the common gate line is one of chromium, titanium, molybdenum, and a molybdenum-tantalum alloy.

32. An area sensor according to claim 8, wherein there is the following relationship between the time constant $\tau 1$ which is determined by a product of the capacitance and the on-resistance of the photoelectric conversion element and the time constant $\tau 2$ which is determined by a product of the gate-line resistance and the gate-line parasitic capacitance:

$$\tau 1 \geqq \tau 2.$$

* * * * *

UNITED STATES PATENT AND TRADEMARK OFFICE
CERTIFICATE OF CORRECTION

PATENT NO. : 6,961,088 B2
DATED : November 1, 2005
INVENTOR(S) : Toshio Kameshima et al.

It is certified that error appears in the above-identified patent and that said Letters Patent is hereby corrected as shown below:

Column 7,
Line 25, "diagrams" should read -- diagram --.

Column 13,
Line 13, "line." should read -- lines. --; and
Line 40, "common" should read -- the common --.

Column 14,
Line 26, "wherein" should read -- wherein, --; and
Line 45, "is" should read -- are --.

Signed and Sealed this

Fourteenth Day of March, 2006

JON W. DUDAS
*Director of the United States Patent and Trademark Office*